(No Model.)
C. W. HUNT.
ANTIFRICTION BEARING.
No. 592,053. Patented Oct. 19, 1897.
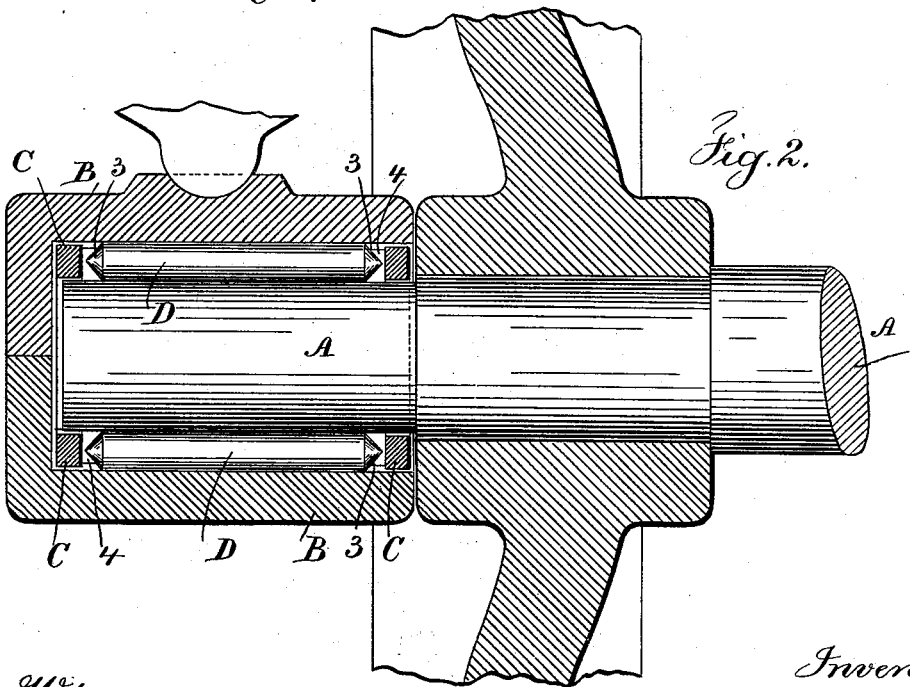

UNITED STATES PATENT OFFICE.

CHARLES W. HUNT, OF WEST NEW BRIGHTON, NEW YORK.

ANTIFRICTION-BEARING.

SPECIFICATION forming part of Letters Patent No. 592,053, dated October 19, 1897.

Application filed June 11, 1897. Serial No. 640,288. (No model.)

*To all whom it may concern:*

Be it known that I, CHARLES W. HUNT, a citizen of the United States, residing at West New Brighton, in the county of Richmond and State of New York, have invented an Improvement in Antifriction-Bearings, of which the following is a specification.

Cylinders of greater or less length have been made use of between the shaft or axle and the surrounding box or bearing, such cylinders taking the pressure by a rolling action and being held in position in a circular cage or frame, and these bearings have been made use of in supporting revolving shafts, and also between an axle or gudgeon and a revolving wheel or hub. In bearings of this character more or less looseness is advantageous between the rollers and the revolving cage or frame, and in practice it is found that the separate cylindrical rollers are not always parallel with the axis of the shaft when the one takes a bearing upon the other. The consequence is that in the rolling movement there is a tendency to press the end of the roll against the cage or frame, not only causing friction between the roll and the cage or frame, but also frequently pressing such cage or frame against the end bearing or collar against which the cage runs, causing friction and wear upon the respective parts, the tendency especially being to grind off the ends of the cage that holds the rolls in position. In cases where rollers have been made with conical ends received into conical recesses in bearing-pieces no free end movement is allowed to the rolls. Hence there is a constant friction and an end pressure upon the bearing whenever the roll is carrying the pressure and is slightly diagonal to the axis of the shaft.

The present invention is for preventing the before-mentioned difficulty; and it consists in providing in the cage V-shaped or inclined surfaces for the ends of the rolls and a space between the ends of the rolls and the cage, the object being to bring each roll into a central position endwise after the pressure upon such roll has been relieved and while it rests against the V-shaped or inclined ends of the recesses of the cage, thus moving each roll back to a normal position in case an end motion has been given to it, so that there will be a readjusting action each time after the roll has taken its bearing or pressure, thus placing each roll in succession in its proper position, so that, if there is an endwise movement as one part rolls upon the other, there will be sufficient looseness to prevent the contact of the end of the roll against its bearing and thus avoid the pressure, grinding action, and severe friction, which have heretofore arisen in antifriction-bearings of this general character.

In the drawings, Figure 1 is a cross-section of the bearing. Fig. 2 is a longitudinal section of the same. Fig. 3 is a detached elevation of the cage or frame. Fig. 4 is an elevation of one of the rolls; and Fig. 5 is a diagram in larger size, illustrating the action of the inclines on the ends of the roll.

A represents the shaft or axle, and B the surrounding hub or box.

C is the cage or frame, that is circular, and D the rolls. These parts may be of any desired size and the rolls may be more or less numerous, and the cage has between one roll and the next bars or partitions 2, which maintain the rolls in their proper relative positions, and by the revolution of the cage the rolls are brought around successively to intervene between A and B and receive the downward pressure of A toward B or the downward pressure of B upon A. Each roll is preferably more or less rounded at each end, as shown at 3, and the ends of the mortises in the cage that receive the rolls, instead of being flat, as usual, are V-shaped or inclined, as shown at 4, and the angle of the V-shaped end preferably should correspond or nearly so to the angle of the cone at the end of the roll; and it is to be understood that the lengths of the mortises should be greater than the lengths of the rolls, so that the proper extent of end movement or play is allowed of each roll.

The cage holding the rolls is carried around by the rolls that are under pressure on one side of the bearing, and carry with it the rolls that are not under pressure. Each roll, as it rises into position to do its work, lies upon the lower side of the recess of the cage, which recess is wider than the diameter of the roll, and when the pressure comes upon the roll the roll moves forward away from the side of the recess. The roll at this point does not touch the cage in any direction, as the conical or tapering ends of the roll leave the ends of the recess and the roll is entirely free, both on the ends and the sides. As the roll continues under pressure and toward the last of its action, it has reached the other side of the recess, and then for a short distance carries the cage with it. If the roll is not parallel with the cylindrical axle on which it is moved, there is a tendency to roll toward one end or the other of the bearing and the roll may touch the cage near one of its ends before touching at the other end, and thereby tend to move the cage endwise, but this is very slight, because the cage revolves freely around the axle. As soon as the strain is off the roll it drops against the side of the mortise and the inclined parts move it endwise into the proper normal position. Hence a direct end pressure of the roll against the cage is prevented, because the roll is loose in the cage and it is returned to a normal position endwise every time it is relieved of pressure.

I do not limit myself to the position of the inclined surfaces of the cage and roll that come together when the roll is out of action to return the roll to a normal position endwise by the action of gravity.

I claim as my invention—

1. In an antifriction-bearing, the combination with the circular cage having parallel mortises, of cylindrical rolls, each setting loosely within its mortise and of a shorter length than such mortise, there being inclined surfaces on the roll and cage acting one against the other for giving end movement to the roll and restoring the same to a normal position by the action of gravity when the roll is free from pressure, substantially as set forth.

2. In an antifriction-bearing, the circular cage having parallel mortises with inclined ends, in combination with rolls setting loosely within the mortises and shorter than such mortises, so that the inclined ends of the mortises give end motion to the rolls in returning them to a normal position when free from pressure, substantially as set forth.

Signed by me this 9th day of June, 1897.

CHAS. W. HUNT.

Witnesses:
GEO. T. PINCKNEY,
S. T. HAVILAND.